Sept. 19, 1961   A. B. FOX   3,001,105
GLASS BEADS AS POTTING MATERIAL FOR ELECTRONIC ASSEMBLIES
Filed Nov. 30, 1956
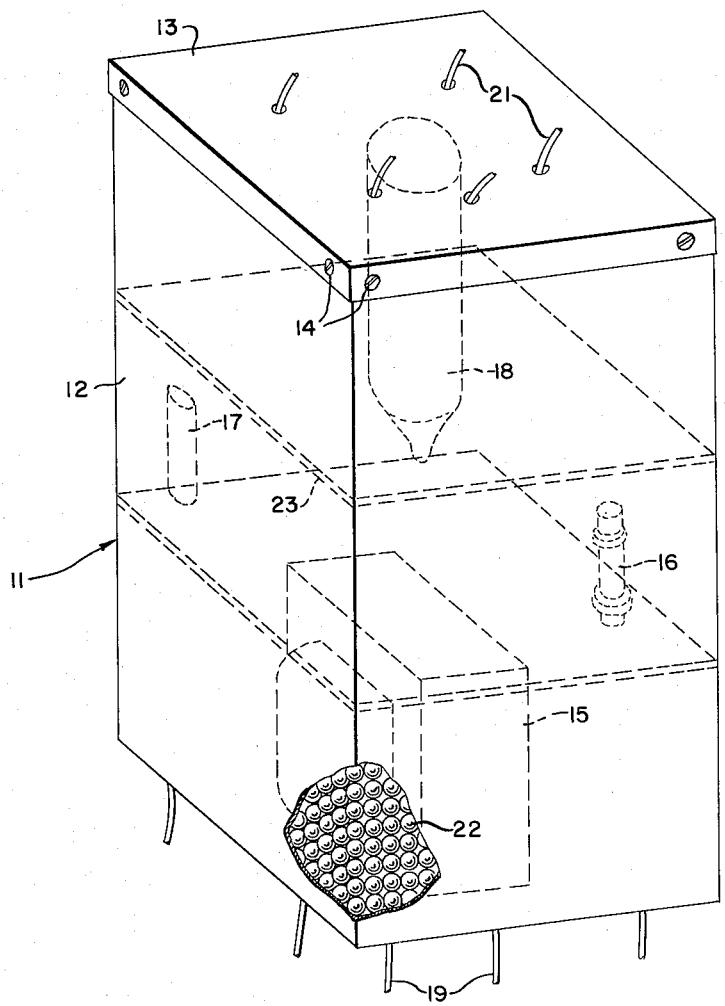
INVENTOR
ARTHUR. B. FOX
BY
ATTORNEYS

3,001,105
GLASS BEADS AS POTTING MATERIAL FOR ELECTRONIC ASSEMBLIES

Arthur B. Fox, Fairport, N.Y., assignor, by mesne assignments, to the United States of America as represented by the Secretary of the Navy
Filed Nov. 30, 1956, Ser. No. 625,564
7 Claims. (Cl. 317—101)

The present invention relates to a potting material for electronic assemblies, and more particularly to a new and improved potting material employing globes of glass or ceramic, or plastic spheres, as the main ingredients thereof.

In the design of an electronic assembly to withstand severe mechanical shocks, it is the practice to place the electronic components in a container or mold and fill the container or mold with some kind of potting material poured or injected therein. This fills the space around each component with an imbedding material which holds the components in proper place. The attributes of a good potting material or compound are that it must be able to be poured or injected under pressure, and subsequently solidify around the components or parts, and it must also have good electrical insulating properties. Moreover, it is desirable that the potting material possess a certain amount of resilience and that its physical properties remain substantially the same over a temperature range from about minus sixty-five degrees (−65) Fahrenheit to about plus one hundred sixty degrees (+160) Fahrenheit.

Heretofore, many different materials and compounds have been employed for this purpose with varying degrees of success. Waxes, and various combinations of wax and rubber, have been tried. In general, they have been found to be too hard at low temperatures and too soft at high temperatures. Thermoplastics, like polyethylene, for example, have been used with some degree of success but they have the disadvantage of shrinkage, resulting in cracks around the components and in thick sections of the thermoplastic. Also, polyethylene is quite hard at low temperatures and tends to soften at high temperatures. Stypol and various epoxy resins which are classed as polymerizing pour potting materials, have the disadvantage of adhering too strongly to the lead wires of the components and of not being sufficiently resilient in this area.

Briefly, the present invention comprises the use, as a potting material, of closely packed small diameter glass globes or ceramic balls or spheres of a plastic having desired properties and air interstices therebetween.

It is therefore an object of the present invention to provide a potting material comprising small diameter spherical pellets.

Another object is the provision of a potting material comprising glass globes or ceramic balls.

A further object is to provide a potting material comprising spheres of a suitable plastic.

The exact nature of this invention as well as other objects and advantages will become apparent from consideration of the following specification relating to the annexed drawing in which:

The figure shows a perspective view, partly broken away, of an electronic assembly unit according to the invention.

Referring now to the drawing, there is shown thereon an electronic assembly designated generally by numeral 11. The assembly comprises a container 12 and a top or closure member 13 therefor, the closure member being suitably secured to the container, for example, by screws 14. It is to be understood, of course, that the container could take other shapes and that the closure member could also be held in place by clips, or be spot welded to the container where the container and member are of metal.

Disposed within the container are the usual electronic components, such as transformers 15, resistors 16, capacitors 17, electrical discharge tubes 18, et cetera, only one each has been shown by way of example. Insulated lead wires 19 extend from some of the components through suitable openings in the container. Other insulated lead wires 21 extend through openings in the closure member. Of course, if desired, suitably insulated prongs could be employed in lieu of the lead wires and the lead wires or prongs could extend through walls of the container, thereby eliminating the necessity for lead wire openings in the closure member.

Filling the space around the electronic components throughout the container are small diameter spherical pellets 22. Where necessary, the container may be compartmented by employment of partitions 23.

The spherical pellets may be globes of glass or of a ceramic material or spheres of a suitable plastic, for instance, polystyrene beads.

The material of which the pellets are made depends on the electronic components constituting the electronic assembly. By the application of Archimedes' principle, the apparent density of any electronic component is the ratio of the weight of the component to the weight of the water displaced by the component, if immersed therein. Similarly, the apparent density of the potting material is the ratio of the weight of the spherical pellets in a unit volume to the weight of an equal volume of water. When the ratio of the apparent density of the electronic component to the apparent density of the potting material is less than unity, there will be a buoying effect, whereas when the ratio is greater than unity, the reverse will be true. With the ratio equalling unity, the components and the potting material will move together as a unit under the acceleration forces and the components will be maintained in their proper relative positions. That is, with the apparent densities of the potting material and electronic components substantially equal, the electronic components will neither be buoyed by nor sink into the potting material. Acceleration forces will therefore act equally on the components and the material and there will be no relative movement therebetween, the components and material moving as one mass. Thus, the density of glass being about 2.6, the apparent density of a volume of glass globes will be somewhat less because of the packing factor which depends on the variation in size of the globes, and with the average apparent density of the electronic components being, by way of example, about midway of 2 and 3, the glass globes would be excellent potting material. Therefore, for electronic components of a heavier nature, for example, transformers, the globes could be of a material having a greater density, such as the ceramics. Where the apparent density of the electronic components is less than the average, spheres of a plastic having a suitable density could be used.

Pellets having a diameter as small as .008 to .010 of an inch have been used with success. Pellets of such size flow almost like a fluid and have the effects hereinbefore referred to. If desired, the pellets may be bonded together, as by an admixture of a polyvinyl alcohol. Or, in the case of plastic pellets, the pellets may be heated to cause them to fuse together at their points of contact with each other.

Consideration may also be given to housing electronic components of approximately the same apparent density together with potting material of about the same apparent density and of suitably partitioning a single container where use is made of potting materials of different densities to obtain substantially unit ratio between apparent densities of components and potting materials.

The present invention has the advantages that material of desired properties fills the space around each component to maintain the same in proper position and that the potting material may be "poured" out for replacement of any of the components, or for inspection of the same after test, without the necessity of applying heat or excessive force with possible attendant damage to the components.

Having thus described the invention, it is obvious that many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A shock proof electronic assembly comprising a container, an electronic component within said container, dry fluid-like potting material filling said container and disposed about said electronic component, the apparent densities of said component and material being substantially equal, said potting material consisting of spherical pellets of matter in closely packed condition and having air interstices therebetween, and the diameter of the pellets being less than one-sixteenth of an inch.

2. An electronic assembly as claimed in claim 1, in which the diameters of the pellets range from eight to ten thousandths of an inch.

3. A shock proof electronic assembly comprising a container, partitions dividing said container into a plurality of compartments, electronic components having approximately the same apparent density in each of said compartments, and fluid-like potting material consisting of dry finely-divided matter of spherical form closely packed in each of said compartments and having air interstices therebetween, the apparent density of the potting material being substantially equal to the apparent density of the electronic components in each of said compartments respectively; whereby under the force of acceleration the components and material move as one mass with substantially no relative movement therebetween.

4. A shock proof electronic assembly comprising a plurality of compartments in a container, electronic components of approximately the same apparent density disposed within the respective compartments of said container, potting material within each of said compartments disposed about said electronic components, said potting material consisting of spherical pellets of matter completely filling the space around each of said components in the compartment and having the same apparent density as the components in contact therewith, said pellets being closely packed and having air interstices therebetween.

5. An electronic assembly of claim 4 in which the diameter of each pellet is less than one-sixteenth of an inch.

6. An electronic assembly as claimed in claim 4, in which the diameters of the pellets range from eight to ten thousandths of an inch.

7. The method of shockproofing an electronic assembly in a compartmented container so that under the force of acceleration the components and potting material move as one mass with substantially no relative movement therebetween, the method consisting of placing a transformer in one end of a container, pouring a closely packed dry fluid-like pellet material having an apparent density substantially the same as the apparent density of said transformer around and over the transformer completely filling the space around the transformer, covering said transformer and pellets with a partition which sectionalizes the container, placing additional electronic components of an apparent density different from the apparent density of said transformer in the middle portion of said container, covering said additional components completely with a dry fluid-like pelleted potting material having an apparent density substantially the same as the apparent density of components in contact therewith, placing an additional partition over said additional electronic components and potting material, inserting electronic components having an apparent density different than the apparent density of the aforesaid components in the top portion of the container, filling completely the top portion of said container around said electronic components with a fluid-like pelleted potting material consisting of dry finely divided matter of spherical form with an apparent density substantially equal to the apparent density of said components in contact therewith, and placing and locking a cover over said container.

References Cited in the file of this patent

UNITED STATES PATENTS

| 2,036,068 | Montsinger | Mar. 31, 1936 |
| 2,335,779 | Mazzei | Nov. 30, 1943 |
| 2,636,073 | Clarke | Apr. 21, 1953 |
| 2,882,505 | Feder | Apr. 14, 1959 |

FOREIGN PATENTS

| 175,239 | Great Britain | Nov. 16, 1922 |